(12) United States Patent
Bucur et al.

(10) Patent No.: US 10,199,688 B2
(45) Date of Patent: Feb. 5, 2019

(54) ONE STEP SYNTHESIS OF NON-CHLORINATED MAGNESIUM ELECTROLYTES

(71) Applicant: Toyota Motor Engineering & Manufacturing North America, Inc., Erlanger, KY (US)

(72) Inventors: Claudiu B. Bucur, Ypsilanti, MI (US); John Muldoon, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 192 days.

(21) Appl. No.: 14/979,254

(22) Filed: Dec. 22, 2015

(65) Prior Publication Data

US 2017/0179531 A1   Jun. 22, 2017

(51) Int. Cl.

| | |
|---|---|
| H01M 6/16 | (2006.01) |
| H01M 6/04 | (2006.01) |
| H01M 10/0568 | (2010.01) |
| H01M 10/054 | (2010.01) |
| H01M 10/0569 | (2010.01) |
| H01M 4/134 | (2010.01) |
| H01M 4/38 | (2006.01) |
| H01M 4/133 | (2010.01) |
| H01M 4/583 | (2010.01) |
| H01M 4/58 | (2010.01) |
| H01M 4/136 | (2010.01) |
| H01M 4/485 | (2010.01) |
| H01M 4/505 | (2010.01) |
| H01M 4/131 | (2010.01) |

(52) U.S. Cl.
CPC ....... *H01M 10/0568* (2013.01); *H01M 4/131* (2013.01); *H01M 4/133* (2013.01); *H01M 4/134* (2013.01); *H01M 4/136* (2013.01); *H01M 4/381* (2013.01); *H01M 4/485* (2013.01); *H01M 4/505* (2013.01); *H01M 4/58* (2013.01); *H01M 4/582* (2013.01); *H01M 4/583* (2013.01); *H01M 4/5825* (2013.01); *H01M 10/054* (2013.01); *H01M 10/0569* (2013.01)

(58) Field of Classification Search
None
See application file for complete search history.

(56) References Cited

U.S. PATENT DOCUMENTS

2013/0034780 A1* 2/2013 Muldoon .............. H01M 4/661
  429/339

OTHER PUBLICATIONS

Ashby, E.C., "A Detailed Description of the Mechanism of Reaction of Grignard Reagents with Ketones", Pure and Applied Chemistry, 1980, vol. 52, No. 3, pp. 545-569.*

* cited by examiner

*Primary Examiner* — Olatunji A Godo
*Assistant Examiner* — Julian Anthony
(74) *Attorney, Agent, or Firm* — Oblon, McClelland, Maier & Neustadt, L.L.P.

(57) ABSTRACT

A one-step method to prepare a magnesium electrolyte salt is provided. According to the method, the magnesium electrolyte is obtained by reacting a Grignard reagent and a fluorinated aryl borane. In addition, formation of monomeric or dimeric magnesium ion is determined by the choice of the Grignard reagent. The magnesium electrolyte may be non-chlorinated and non-corrosive. A magnesium battery containing the magnesium electrolyte is also provided.

15 Claims, 5 Drawing Sheets

ONE STEP SYNTHESIS OF NON-CHLORINATED MAGNESIUM ELECTROLYTES

BACKGROUND

Field of the Disclosure

The present disclosure is directed to a method to prepare an electrolyte for a magnesium battery.

Discussion of the Background

Magnesium batteries have been the subject of high interest and significant research and development effort in order to provide more economical, safer and higher capacity batteries to displace or supplement the conventional lithium batteries. Compared to lithium, Mg potentially has a volumetric capacity of 3832 mAh cm$^{-3}$ which is significantly greater than the 2062 mAh cm$^{-3}$ of Li. Additionally, Mg has a negative reduction potential of −2.356V vs NHE. As the seventh most abundant element in the earth's crust, Mg has a lower resource cost and a lower environmental impact profile.

An ongoing objective in battery research is increasing the energy density beyond that offered by lithium ion batteries. This may require a shift towards batteries containing a pure metal anode. However, in the case of lithium, deposition occurs unevenly with formation of dendrites which leads to safety concerns during cycling and renders Li metal unsafe for commercialization as a high capacity anode material. In contrast to lithium metal, magnesium metal deposition is not plagued by dendritic formation. Additionally, magnesium is more stable than lithium when exposed to air. However, magnesium has a reductive potential of −2.356 V vs. NHE and has a unique electrochemistry which precludes the use of magnesium electrolytes that are analogues of lithium electrolytes. Reduction of magnesium analogues such as Mg(PF$_6$)$_2$, Mg(ClO$_4$)$_2$ and Mg(TFSI)$_2$ results in the formation of a blocking film on the magnesium anode surface through which successful deposition of magnesium has not been observed (Feng, Z: Surface Coating Technologies, Vol 201, pp 3783-3787, 2006).

Reports of effective magnesium electrodeposition from Grignard reagents in ethereal solutions date as far back as 1927 and have periodically appeared in the literature ever since. In an attempt to enhance the stability of the electroplating baths based on Grignards, in 1957 Connor et al. (Connor: Journal of The Electrochemical Society, Vol 104, pp 38-41, 1957) investigated the electrodeposition of magnesium from magnesium borohydride Mg(BH$_4$)$_2$ generated in situ by the reaction of MgBr$_2$ and LiBH$_4$. Unfortunately, boron and magnesium co-deposit in a 1:9 ratio. Recently, Mohtadi et al. (Mohtadi: Angewandte Chemie International Edition, Vol 51, pp 9780-9783, 2012) have demonstrated the use of magnesium borohydride as an electrolyte for magnesium battery. The oxidative stability of Mg(BH$_4$)$_2$ has been reported similar to Grignard solutions. However, one of the obstacles in developing high voltage rechargeable magnesium batteries is moving beyond the oxidative stability of Grignard reagents such as ethylmagnesium bromide (EtMgBr) and butylmagnesium chloride (BuMgCl) which have an oxidative stability of 1.3V vs. Mg. The low oxidative stability of these Grignard solutions limits the choice of available cathodes. In 1990, Gregory et al. (Gregory: Journal of The Electrochemical Society, Vol 137, pp 775-780, 1990) synthesized an electrolyte Mg[B(C$_4$H$_9$)$_4$]$_2$ from the reaction of dibutylmagnesium and the Lewis acid tri-n-butylborane which showed enhanced oxidative stability versus BuMgBr. It was assumed that the character of the Lewis acid could be a factor in improving the voltage stability. Gregory also evaluated magnesium deposit quality by spiking of alkyl Grignards such as ethylmagnesium chloride (EtMgCl) and methylmagnesium chloride (MeMgCl) with aluminum trichloride (AlCl$_3$) to enhance electrochemical plating.

Aurbach et al. (Aurbach: Nature, Vol 407, pp 724-727, 2000) has popularized a novel class of electrolytes called magnesium organohaloaluminates. One such electrolyte called APC is generated in situ by the reaction of aluminum trichloride (AlCl$_3$) with the Grignard reagent phenylmagnesium chloride (PhMgCl) in a 1:2 ratio and has an oxidative stability in excess of 3.2 V vs. Mg and can deposit/dissolve magnesium with high coulombic efficiencies. Magnesium organohaloaluminate electrolytes possess a high oxidative stability on inert electrodes (above 3.0 V vs. Mg) such as Pt or glassy carbon and are capable of depositing and stripping magnesium at high currents. However, they have been reported to be corrosive towards less noble metals such as aluminum, nickel and stainless steel which limits charging in a coin cell battery configuration to under 2.2 V due to the utilization of such metals in the casing and current collector material. Since the oxidative stability of electrolytes governs the choice of cathodes, it is of paramount importance to develop a non-corrosive magnesium electrolyte which will permit discovery of high voltage cathodes. Improving the voltage stability of magnesium electrolytes on stainless steel is crucial because stainless steel is a widely used current collector and a major component in a variety of batteries such as coin cells. Current state of the art magnesium organohaloaluminate electrolytes limit the usage of Mg battery coin cells to operating under 2.3V vs Mg.

The present inventors (U.S. patent application Ser. No. 14/263,392) described an ion-exchange pathway that converts a magnesium electrolyte containing chlorides into a chloride-free magnesium borate salt. However, this reference does not describe a one step synthesis of non-chlorinated magnesium electrolytes by reacting a Grignard reagent with a fluorinated aryl borane.

Therefore, an object of the present disclosure is to provide an efficient facile method to prepare a non-chlorinated electrolyte or an electrolyte with low chloride content suitable for a magnesium battery.

It is a further object to prepare non-corrosive or low-corrosive electrolytes for a magnesium battery.

It is a further object to provide magnesium electrochemical cells employing the magnesium electrolyte and magnesium batteries containing the electrochemical cell.

SUMMARY

The present disclosure provides a method to prepare magnesium electrolytes containing dimeric or monomeric magnesium ion by a judicious choice of the Grignard reagent. These and other objects have been achieved by the present disclosure, the first embodiment of which includes a method to prepare a magnesium salt of formula (I):

Mg(ROR)$_y$[B(Ar$_F$)$_3$Ph]$_2$ (I) 

wherein ROR is a nonaqueous solvent comprising an ether oxygen and y is an integer of 2 to 6, Ar$_F$ is an optionally substituted phenyl group comprising at least one fluorine substituent and Ph is a C$_6$H$_5$— group. The method comprises reacting PhMgI with a boron compound of formula (II), B(Ar$_F$)$_3$ (II) 

in the solvent ROR.

In selected embodiments, $Ar_F$ may be a phenyl group which comprises at least one fluorine atom or a phenyl group which comprises at least one substituent selected from the group consisting of a $CF_3$— group, a $CF_2H$ group and a $CFH_2$— group.

In a specific embodiment, $Ar_F$ is a $C_6F_5$— group.

A second embodiment includes a method to prepare a magnesium salt of formula (III):

$$[Mg_2(\mu\text{-}X)_3.(ROR)_y][B(Ar_F)_3Ph] \quad (III)$$

wherein ROR is a nonaqueous solvent comprising an ether oxygen and y is an integer of 2 to 6, $Ar_F$ is an optionally substituted phenyl group comprising at least one fluorine substituent, Ph is a $C_6H_5$— group and X is Cl or Br. The method comprises reacting PhMgX with a boron compound of formula (II), $$B(Ar_F)_3 \quad (II)$$

in the solvent ROR.

The present disclosure also includes a magnesium battery, comprising a negative electrode comprising magnesium as an active ingredient, a positive electrode, a solvent and a magnesium electrolyte of at least one of formula (I) and formula (III):

$$Mg(ROR)_y[B(Ar_F)_3Ph]_2 \quad (I),$$

$$[Mg_2(\mu\text{-}X)_3.(ROR)_y][B(Ar_F)_3Ph] \quad (III)$$

wherein ROR is a nonaqueous solvent comprising an ether oxygen and y is an integer of 2 to 6, X is Cl or Br, $Ar_F$ is an optionally substituted phenyl group comprising at least one fluorine substituent and Ph is a $C_6H_5$— group.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

DETAILED DESCRIPTION OF THE DISCLOSURE

Figure 1:
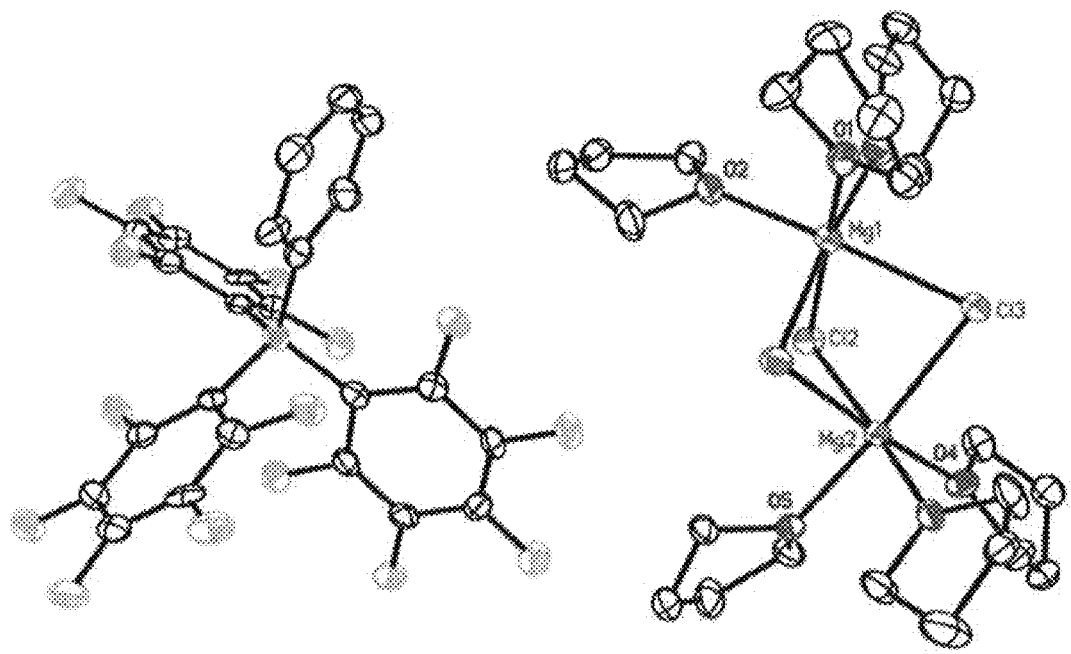
FIG. 1 shows an ORTEP plot of $[Mg_2(\mu\text{-}Cl)_3.6THF][B(C_6F_5)_3Ph]$ prepared in the Example.

Within the description of this disclosure, all cited references, patents, applications, publications and articles that are under authorship, joint authorship or ascribed to members of the Assignee organization are incorporated herein by reference. Where a numerical limit or range is stated, the endpoints are included. Also, all values and subranges within a numerical limit or range are specifically included as if explicitly written out. As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted.

The present disclosure relates to a one-step synthesis of magnesium electrolytes involving reacting a Grignard reagent and a fluorinated aryl borane. The present disclosure also provides a method to prepare magnesium electrolytes containing dimeric or monomeric ("naked") magnesium ion by a judicious choice of the Grignard reagent. Suitable use of a Grignard reagent may lead to chloride-free magnesium electrolytes that are non-corrosive and compatible with non-noble metals such as Al, Cu and stainless steel for utility in a magnesium battery. A magnesium ion is "naked" in the sense that it is coordinated by solvent molecules and not complexed with chlorides as shown in the complex dimer conventionally formed in organohaloaluminate electrolytes. The present inventors (U.S. Pat. No. 8,722,242) described a magnesium battery containing an electrolyte, $[Mg_2(\mu\text{-}Cl)_3.6THF](BR_4)$, obtained by reacting a Grignard reagent or Hauser base with a boron compound of formula $BR_3$, where R is each independently a C(1-12) alkyl or C(6-10) aryl group, optionally substituted with alkoxy, cyano, nitro or C(1-6) alkyl groups.

Thus, in a first embodiment, the present disclosure provides a method to prepare a magnesium salt of formula (I):

$$Mg(ROR)_y[B(Ar_F)_3Ph]_2 \quad (I)$$

wherein ROR is a nonaqueous solvent comprising an ether oxygen and y is an integer of 2 to 6, $Ar_F$ is an optionally substituted phenyl group comprising at least one fluorine substituent and Ph is a $C_6H_5$— group. The method comprises reacting PhMgI with a boron compound of formula (II), $$B(Ar_F)_3 \quad (II)$$

in the solvent ROR according to the equation (c):

$$2B(Ar_F)_3 + 2PhMgI \rightarrow Mg(ROR)_y[B(Ar_F)_3Ph]_2 + MgI_2(s) \quad (c)$$

In a preferred embodiment, the magnesium salt of formula (I) is free of chlorides.

In at least one embodiment, $Ar_F$ is a phenyl group which comprises at least one fluorine atom or a phenyl group which comprises at least one substituent selected from the group consisting of a $CF_3$— group, a $CF_2H$ group and a $CFH_2$— group. In a preferred embodiment, $Ar_F$ is a $C_6F_5$— group and the reaction is described by equation (a):

$$2B(C_6F_5)_3 + 2PhMgI \rightarrow Mg(ROR)_y[(C_6F_5)_3B(C_6H_5)]_2 + MgI_2(s) \quad (a)$$

In a second embodiment, the present disclosure provides a method to prepare a magnesium salt of formula (III):

$$[Mg_2(\mu\text{-}X)_3.(ROR)_y][B(Ar_F)_3Ph] \quad (III)$$

wherein ROR is a nonaqueous solvent comprising an ether oxygen and y is an integer of 2 to 6, $Ar_F$ is an optionally substituted phenyl group comprising at least one fluorine substituent, Ph is a $C_6H_5$— group and X is Cl or Br. The method comprises reacting PhMgX with a boron compound of formula (II), $$B(Ar_F)_3 \quad (II)$$

in the solvent ROR.

In a preferred embodiment, $Ar_F$ is a $C_6F_5$— group and the magnesium salt of formula (III) is $[Mg_2(\mu\text{-}X)_3.6THF][(C_6F_5)_3B(C_6H_5)]$.

Crystals of the magnesium electrolyte salt may be obtained from the ether solvent by layering with a hydrocarbon solvent such as hexane, cyclohexane or a petroleum ether. The obtained crystals may be crystallized from an aromatic solvent such as toluene or xylene.

The nonaqueous solvent, ROR, may be any solvent containing an ether oxygen and includes, for example, tetrahydrofuran (THF), dimethoxyethane (DME) and diethylene glycol dimethyl ether (diglyme) (DGM). These examples are not intended to be limiting and any ether may be suitable as long as other groups reactive to the anion [B(Ar$_F$)$_3$Ph]$^-$ are not present. Tetrahydrofuran may be a preferred ether solvent for preparing the Mg electrolytes. Exemplary examples of equation (c) conducted in THF are indicated by the following equation:

$$2B(C_6F_5)_3 + 2PhMgI \rightarrow Mg(THF)_6[(C_6F_5)_3B(C_6H_5)]_2 + MgI_2(s) \quad (c)$$

In another embodiment, the method described may be universally employed to prepare magnesium electrolytes containing magnesium ions which are described as "naked" in this respect. As indicated in the description of the Example, the magnesium ion is coordinated by solvent molecules. When the solvent is THF, a monodentate ligand, a total of six molecules may be present. However, if the salt is crystallized from a solvent such as toluene, toluene may partially replace THF in the solvent sphere about the magnesium ion.

In further embodiments, the present disclosure provides a magnesium battery, comprising:

a negative electrode comprising magnesium as an active ingredient;

a positive electrode;

a solvent; and a magnesium electrolyte salt of formula (I) and/or formula (III):

$$Mg(ROR)_y[B(Ar_F)_3Ph]_2 \quad (I),$$

$$[Mg_2(\mu-X)_3\cdot(ROR)_y][B(Ar_F)_3Ph] \quad (III)$$

wherein ROR is a nonaqueous solvent comprising an ether oxygen and y is an integer of 2 to 6, X is Cl or Br, Ar$_F$ is an optionally substituted phenyl group comprising at least one fluorine substituent and Ph is a C$_6$H$_5$— group. The magnesium electrolyte of formula (I) is obtained by reacting PhMgI with a boron compound of formula (II), $$B(Ar_F)_3 \quad (II)$$

in the solvent ROR.

And, the magnesium electrolyte of formula (III) is obtained by reacting PhMgBr or PhMgCl with a boron compound of formula (II), $$B(Ar_F)_3 \quad (II)$$

in the solvent ROR.

The magnesium battery may further comprise a non-noble metal component. As used herein, the term "non-noble metal component" refers to metals and/or alloys that corrode and/or oxidize easily. Non-limiting examples of non-noble metal components include aluminum, nickel, copper and stainless steel.

In a further embodiment of the disclosure, the magnesium battery may contain at least one stainless steel component and in a preferred embodiment the current collector for the magnesium battery is stainless steel.

The Mg electrolytes of formulae (I) and (III) are soluble in ether solvents such as tetrahydrofuran, polyethers, 2-methyl tetrahydrofuran, dimethoxyethane, dimethyl glycol, glyme, monoglyme, ethylene glycol, dimethyl ether, diethyl ether, ethyl glyme, diglyme, proglyme, ethyl diglyme, triglyme, butyl diglyme, tetraglyme, polyglyme, higlyme or combinations thereof. One may also dissolve the Mg electrolyte in an ether containing solvent and soak it in a polymer film to form a polymer based electrolyte.

The positive electrode of the Mg battery may contain any positive electrode active material which is stable to the Mg electrolytes of formulae (I) and (III). Examples of such positive electrode active material may include sulfur, Chevrel phase Mo$_6$S$_8$, MnO$_2$, CuS, Cu$_2$S, Ag$_2$S, CrS$_2$, VOPO$_4$, layered structure compounds such as TiS$_2$, V$_2$O$_5$, MgVO$_3$, MoS$_2$, MgV$_2$O$_5$, MoO$_3$, Spinel structured compounds such as CuCr$_2$S$_4$, MgCr$_2$S$_4$, MgMn$_2$O$_4$, Mg$_2$MnO$_4$, NASICON structured compounds such as MgFe$_2$(PO$_4$)$_3$ and MgV$_2$(PO$_4$)$_3$, Olivine structured compounds such as MgMnSiO$_4$ and MgFe$_2$(PO$_4$)$_2$, Tavorite structured compounds such as Mg$_{0.5}$VPO$_4$F, pyrophosphates such as TiP$_2$O$_7$ and VP$_2$O$_7$, and fluorides such as FeF$_3$.

According to conventional practice, the positive electrode may also contain an electronically conductive additive, such as carbon black, Super P, Super C65, Ensaco black, Ketjen black, acetylene black, synthetic graphite such as Timrex SFG-6, Timrex SFG-15, Timrex SFG-44, Timrex KS-6, Timrex KS-15, Timrex KS-44, natural flake graphite, carbon nanotubes, fullerenes, hard carbon, and mesocarbon microbeads.

Additionally, the positive electrode may further comprise a polymer binder. Non-limiting examples of polymer binders include poly-vinylidene fluoride (PVdF), poly(vinylidene fluoride-co-hexafluoropropene) (PVdF-HFP), Polytetrafluoroethylene (PTFE), Kynar Flex 2801, Kynar Powerflex LBG, and Kynar HSV 900, and Teflon. Polyvinylidene fluoride (PVdF) is a preferred binder.

Solvents suitable in the Mg battery may be any aprotic solvent which is compatible with magnesium and the other components of the battery, including the magnesium salts of formulae (I) and (III). Conventional solvents selected from the group consisting of tetrahydrofuran. 2-methyl tetrahydrofuran, dimethoxyethane, glyme, monoglyme, dimethyl glycol, dimethyl ether, diethyl ether, ethyl glyme, diglyme, proglyme, ethyl diglyme, triglyme, butyl diglyme, tetraglyme, polyglyme, higlyme, and combinations thereof may be included in the claimed Mg battery.

Halide containing solvents and halide salts may be excluded from the Mg battery as described above.

The Mg battery according to the disclosure may be constructed by methods which are conventionally known and may be a button or coin cell battery consisting of a stack of negative electrodes, porous polypropylene or glass fiber separators, and positive electrode disks in a can base onto which a can lid is crimped. Alternatively, the Mg battery may be a stacked cell battery. In other embodiments, the Mg battery may be a prismatic, or pouch, cell consisting of one or more stacks of negative electrode, porous polypropylene or glass fiber separator, and positive electrode sandwiched between current collectors, as described above. The stack(s) may be folded within a polymer coated aluminum foil pouch, vacuum and heat dried, filled with electrolyte, and vacuum and heat sealed. In other embodiments, the Mg battery may be a prismatic, or pouch, bi-cell consisting of one or more stacks of a positive electrode which is coated with active material on both sides and wrapped in porous polypropylene or glass fiber separator, and a negative electrode folded around the positive electrode. The stack(s) are folded within a polymer coated aluminum foil pouch, dried under heat and/or vacuum, filled with electrolyte, and vacuum and heat sealed. In some embodiments of the prismatic or pouch cells described herein, an additional tab composed of a metal foil or carbonaceous material may be affixed to the current collector by laser or ultrasonic welding, adhesive, or mechanical contact, in order to connect the electrodes to the device outside the packaging. In other embodiments, the Mg battery disclosed herein is a wound or cylindrical cell consisting of wound layers of one or more stacks of a positive electrode which is coated with active material on one or both sides, sandwiched between layers of porous polypropylene or glass fiber separator, and a negative electrode. The stack(s) are wound into cylindrical roll, inserted into the can, dried under heat and/or vacuum, filled with electrolyte, and vacuum and welded shut. In some embodiments of the cylindrical cells described herein, an additional tab composed of a metal foil or carbonaceous material may be affixed to the current collector by laser or ultrasonic welding, adhesive, or mechanical contact, in order to connect the electrodes to the device outside the packaging.

The stainless steel component, including the current collector may be constructed of any of the conventionally known stainless types, including 302, 304, 305, 316 and 384.

Having generally described this disclosure, a further understanding can be obtained by reference to certain specific examples which are provided herein for purposes of illustration only and are not intended to be limiting unless otherwise specified. Skilled artisans will recognize the utility of the devices of the present disclosure as a battery as well as the general utility of the electrolyte system described herein.

EXAMPLES

Preparation of $[Mg_2(\mu\text{-}Cl)_3 \cdot 6THF][B(C_6F_5)_3Ph]$ Electrolyte:

In an argon-filled glovebox, 2 g of $B(C_6F_5)_3$ (0.0039 mol) was dissolved in 2.0 ml of THF. 5.57 ml of PhMgCl (2M solution in THF) was rapidly added to the vial. The reaction was allowed to stir rapidly for 3 days. The solution was then layered with dry hexane (Aldrich). Crystals were obtained over the period of a few days. These crystals were washed with THF:hexane, and dried.

Figure 6:
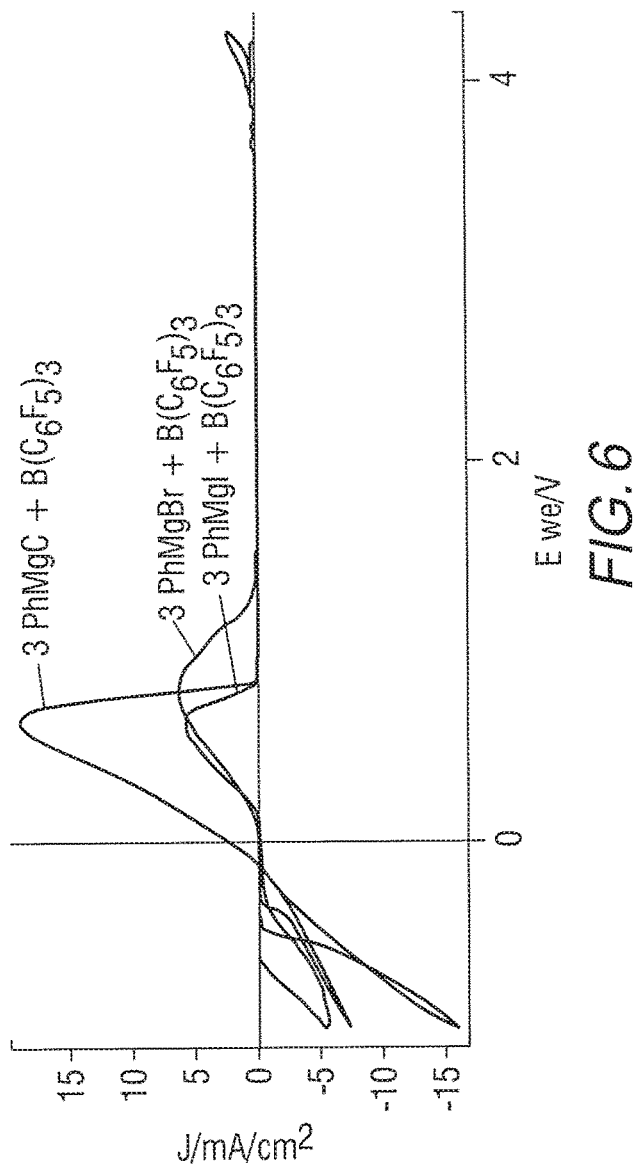
FIG. 6 shows an electrochemical cyclic voltammogram of the Mg electrolytes on stainless steel working electrode with a surface area of 0.02 cm² at a scan rate of 25 mV s⁻¹.

FIG. 1 shows the structure of $[Mg_2(\mu\text{-}Cl)_3 \cdot 6THF][B(C_6F_5)_3Ph]$. The electrochemical cyclic voltammogram of $[Mg_2(\mu\text{-}Cl)_3 \cdot 6THF][B(C_6F_5)_3Ph]$ on a stainless steel working electrode is shown in FIG. 6.

Preparation of $[Mg_2(\mu\text{-}Br)_3 \cdot 6THF][B(C_6F_5)_3Ph]$ Electrolyte:

In an argon-filled glovebox, 2 g of $B(C_6F_5)_3$ (0.0039 mol) was dissolved in 2.0 ml of THF. 5.57 ml of PhMgBr (2M solution in THF] was rapidly added to the vial. The reaction was allowed to stir rapidly for 3 days. The solution was then layered with dry hexane (Aldrich). Crystals were obtained over the period of a few days. These crystals were washed with THF:hexane, and dried.

Figure 2:
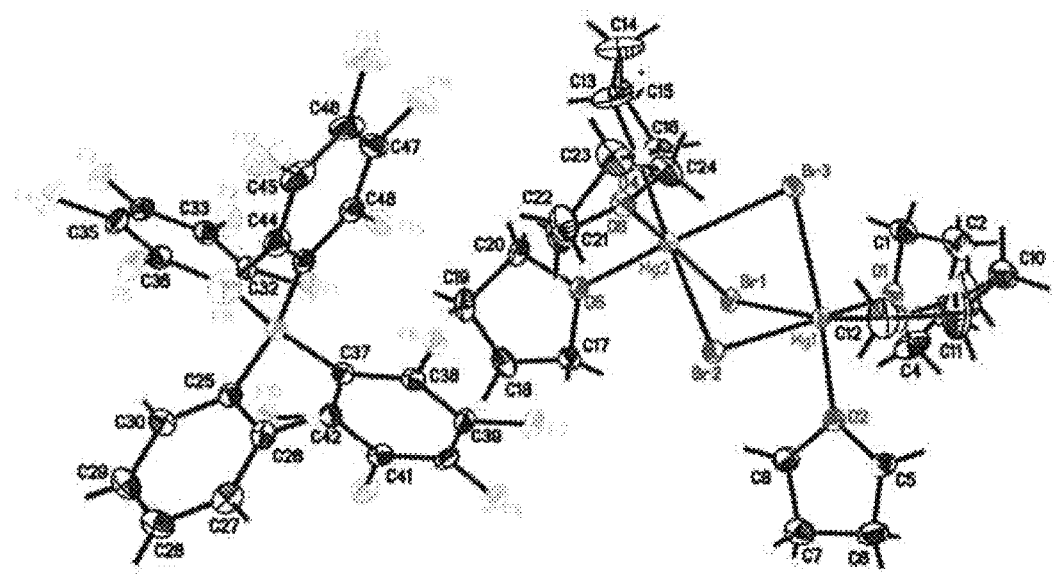
FIG. 2 shows an ORTEP plot of $[Mg_2(\mu\text{-}Br)_3.6THF][B(C_6F_5)_3Ph]$ prepared in the Example.

FIG. 2 shows the structure of $[Mg_2(\mu\text{-}Br)_3 \cdot 6THF][B(C_6F_5)_3Ph]$. The electrochemical cyclic voltammogram of $[Mg_2(\mu\text{-}Br)_3 \cdot 6THF][B(C_6F_5)_3Ph]$ on a stainless steel working electrode is shown in FIG. 6.

Preparation of $(Mg \cdot 6THF)[B(C_6F_5)_3Ph]_2$ Electrolyte:

In an argon-filled glovebox, 2 g of $B(C_6F_5)_3$ (0.0039 mol) was dissolved in 2.0 ml of THF. 5.57 ml of PhMgI (2M solution in ether) was rapidly added to the vial. The reaction was allowed to stir rapidly for 3 days. The solution was then layered with dry hexane (Aldrich). Crystals were obtained over the period of a few days. These crystals were washed with THF:hexane, and dried.

Figure 3:
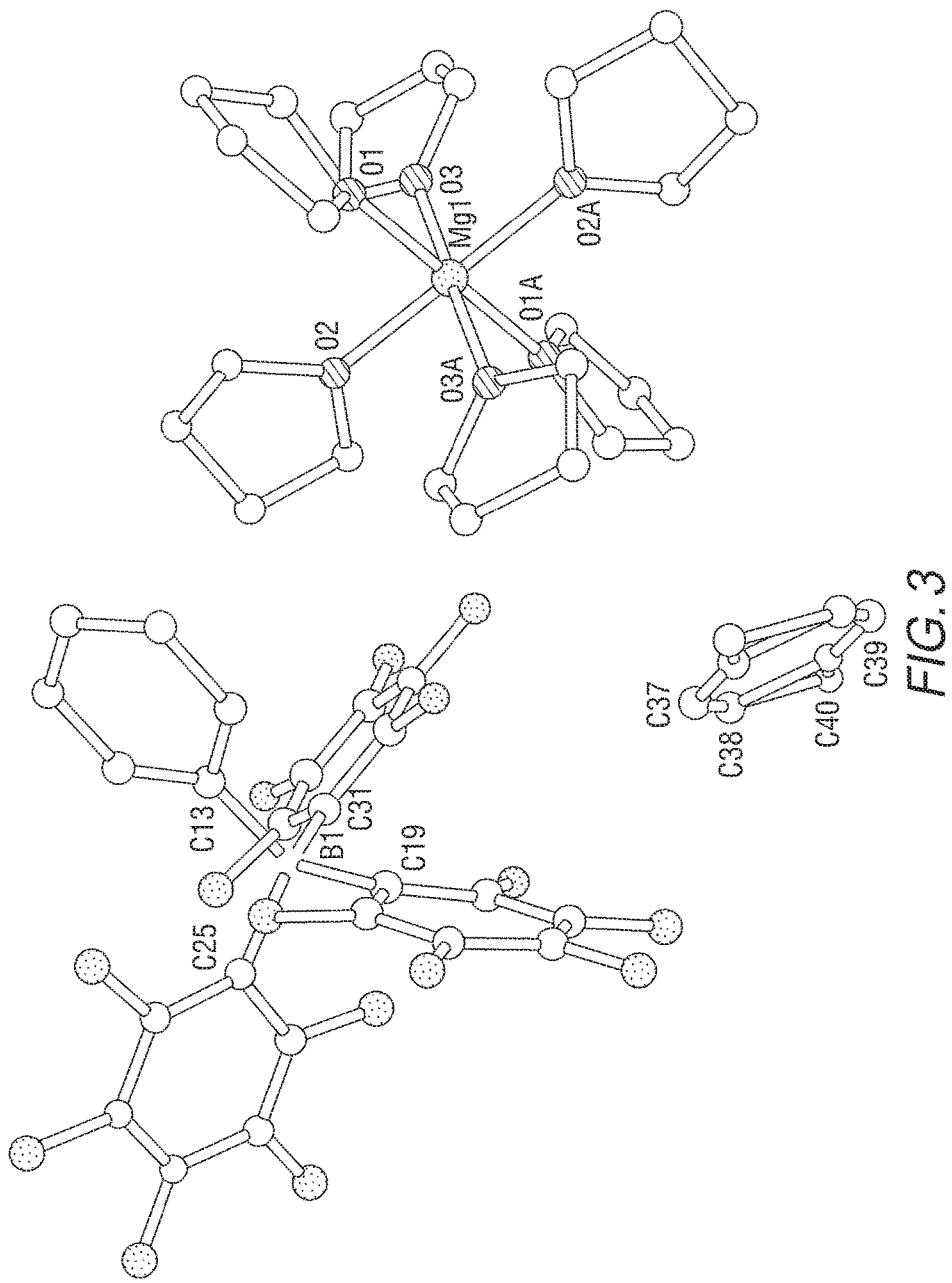
FIG. 3 shows an ORTEP plot of $[Mg.6THF][B(C_6F_5)_3Ph]_2$ prepared in the Example.

FIG. 3 shows the structure of $(Mg \cdot 6THF)[B(C_6F_5)_3Ph]_2$. In the unit cell of the C-centered, monoclinic space group C2/c, there are four molecules of the $[Mg(THF)_6]^{2+}$ cation, eight molecules of the $[B(C_6F_5)_3Ph]^-$ anion and twelve molecules of THF. The Mg cation ion crystallizes on the crystallographic two-fold axis at [0, y, 0.75] and adopts an octahedral geometry filled by six THF moieties.

Figure 4:
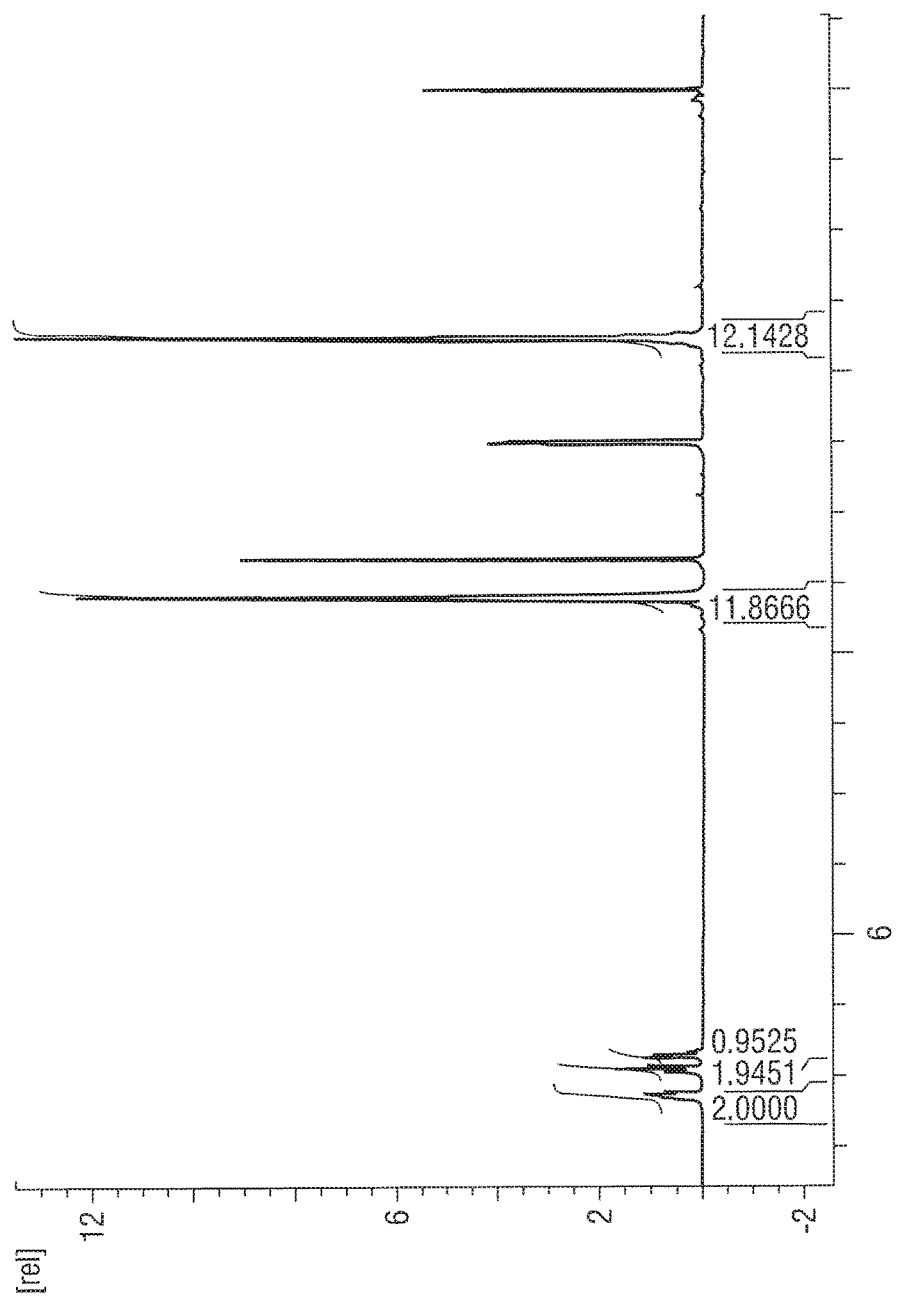
FIG. 4 shows a $^1H$ NMR spectrum of $[Mg.6THF][B(C_6F_5)_3Ph]_2$ prepared in the Example.
Figure 5:
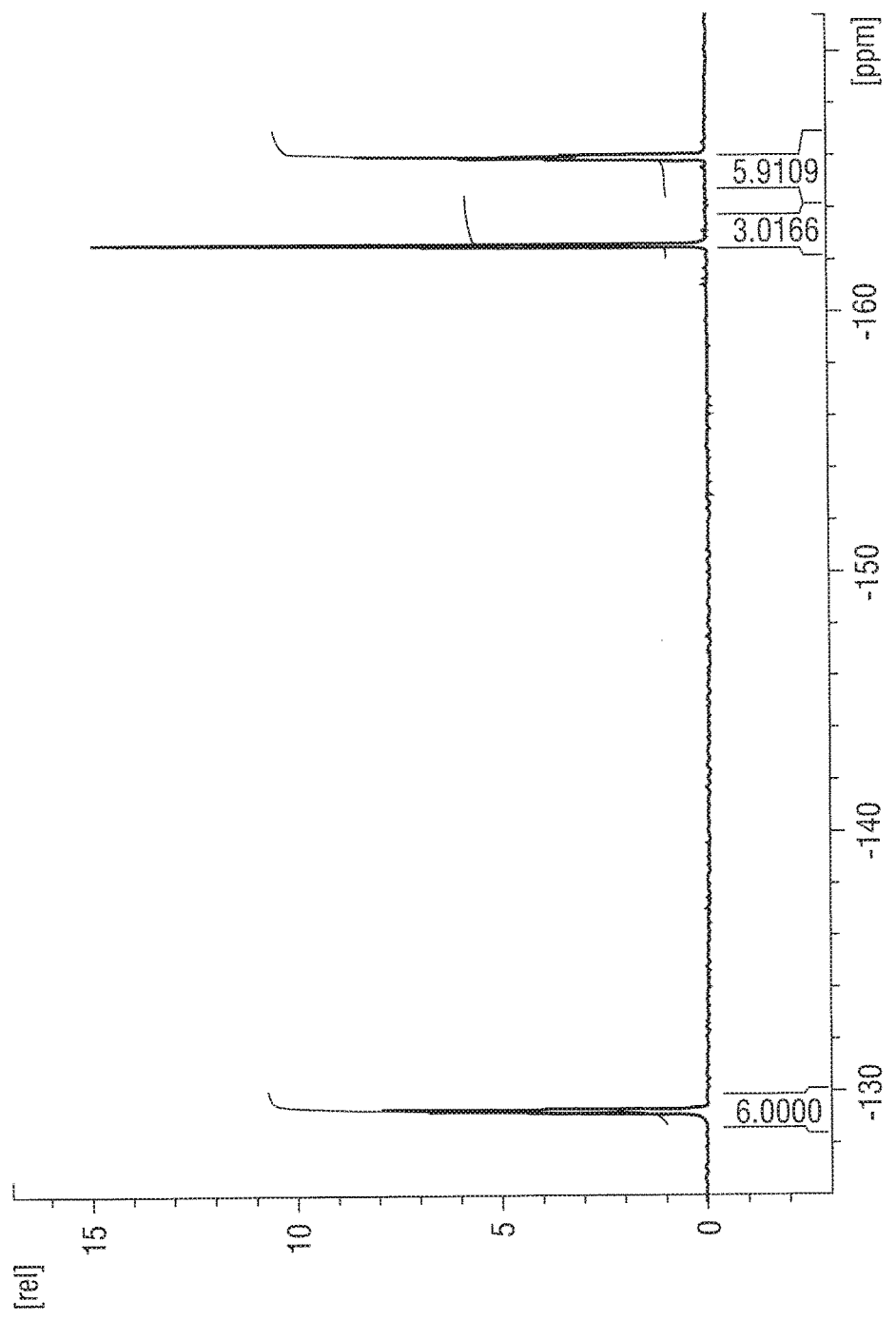
FIG. 5 shows a $^{19}F$ NMR spectrum of $[Mg.6THF][B(C_6F_5)_3Ph]_2$ prepared in the Example.

FIGS. 4 and 5 show the $^1H$ and $^{19}F$ NMR spectra, respectively, of $(Mg \cdot 6THF)[B(C_6F_5)_3Ph]_2$. The electrochemical cyclic voltammogram of $(Mg \cdot 6THF)[B(C_6F_5)_3Ph]_2$ on a stainless steel working electrode is shown in FIG. 6.

The solubility of $(Mg \cdot 6THF)[B(C_6F_5)_3Ph]_2$ in glyme is comparable to the solubility of magnesium organohaloaluminates in THF (>0.2M). The room temperature conductivity of $(Mg \cdot 6THF)[B(C_6F_5)_3Ph]_2$ is around 1.5 mS cm$^{-1}$, which is similar to those in situ generated magnesium organohaloaluminates (Aurbach: Nature, Vol 407, pp 724-727, 2000) and nearly double that of $LiPF_6$ at a similar concentration of 0.2 M in THF.

Instrumentation:

Single-Crystal X-Ray Diffraction

An arbitrary sphere of data were collected on a colorless block-like crystal, having approximate dimensions of, on a on a Bruker Kappa X8-APEX-II diffractometer or a Bruker APEX-II diffractometer using a combination of ω- and φ-scans of 0.5°. In both cases, data were corrected for absorption and polarization effects and analyzed for space group determination. The structure was solved by direct methods and expanded routinely. The model was refined by full-matrix least-squares analysis of $F^2$ against all reflections. All non-hydrogen atoms were refined with anisotropic thermal displacement parameters. Unless otherwise noted, hydrogen atoms were included in calculated positions. Thermal parameters for the hydrogen atoms were tied to the isotropic thermal parameter of the atom to which they are bonded (1.5× for methyl, 1.2× for all others).

NMR Spectroscopy

All NMR experiments were performed at magnetic field strengths of 9.4 ($^1H$) and 7.05 ($^{19}F$) T corresponding to $^1H$ resonance frequencies of 400 and 300 MHz, respectively, and at ambient temperature (~21° C.) using 400 MHz Bruker DRX and 300 MHz Varian UnityPlus spectrometers. The Bruker DRX spectrometer was equipped with a 5 mm broadband probe to measure one-dimensional (1D) $^1H$ spectrum. $^{19}F$ spectra were measured using 5 mm 4 nuclei probe ($^1H$, $^{13}C$, $^{19}F$, $^{31}P$) on the Varian UnityPlus spectrometer. Usually 20 mg of sample were dissolved in 0.6 mL of $d_8$-THF-$d_8$ or $d_6$-acetone. $^{19}F$ spectrum was referenced indirectly using an external reference standard (δ=0) $CFCl_3$ in $CDCl_3$.

Electrochemistry

All electrolytes were evaluated at 0.2 M in a glove box. Cyclic voltammograms were obtained using a BioLogic SAS, model VMP3, Science Instruments potentiostat in a conventional 3-electrode cell at room temperature (21° C.) with a Pt or stainless steel working electrodes with 0.02 cm$^2$ and 0.0341 cm$^2$ surface areas, a Mg wire reference electrode, and a Mg ribbon counter electrode. Data was processed with EC-Lab Software V10.02 with the corresponding VMP3 firmware, provided by Science Instruments.

The invention claimed is:

1. A method to prepare a magnesium salt of formula (I)

$$Mg(ROR)_y[B(Ar_F)_3Ph]_2 \quad (I)$$

wherein
ROR is a nonaqueous solvent comprising an ether oxygen and y is an integer of 2 to 6,
$Ar_F$ is an optionally substituted phenyl group comprising at least one fluorine substituent,
Ph is a —$C_6H_5$— group,
the method comprising:
reacting PhMgI with a boron compound of formula (II), $$B(Ar_F)_3 \quad (II)$$

in the solvent ROR.

2. The method of claim 1, wherein $Ar_F$ is a phenyl group which comprises at least one fluorine atom.

3. The method of claim 1, wherein $Ar_F$ is a phenyl group which comprises at least one substituent selected from the group consisting of a $CF_3$— group, a $CF_2H$ group and a $CFH_2$— group.

4. The method of claim 1, wherein $Ar_F$ is a —$C_6F_5$— group.

5. The method of claim 1, wherein the nonaqueous solvent comprising an ether oxygen is at least one solvent selected from the group consisting of tetrahydrofuran (THF), dimethoxyethane (DME) and di ethylene glycol dimethyl ether (diglyme) (DGM).

6. The method of claim 1, wherein the magnesium salt of formula (I) is $Mg(THF)_6[(C_6F_5)_3B(C_6H_5)]_2$.

7. A method to prepare a magnesium salt of formula (IV):

$$Mg(THF)_6[(C_6F_5)_3B(C_6H_5)]_2 \quad (IV)$$

wherein
THF is a tetrahydrofuran molecule,
the method comprising:
reacting PhMgI with $B(C_6F_5)_3$ in THF.

8. A magnesium battery, comprising:
a negative electrode comprising magnesium as an active ingredient;
a positive electrode;
a solvent; and
a magnesium electrolyte of formula (I):

$$Mg(ROR)_y[B(Ar_F)_3Ph]_2 \quad (I),$$

wherein
ROR is a nonaqueous solvent comprising an ether oxygen and y is an integer of 2 to 6,
$Ar_F$ is an optionally substituted phenyl group comprising at least one fluorine substituent, and
Ph is a $C_6H_5$— group.

9. The magnesium battery of claim 8, wherein the negative electrode is magnesium.

10. The magnesium battery of claim 8, wherein the positive electrode active material comprises at least one component selected from the group consisting of sulfur, graphitic carbon, carbon fiber, glassy carbon, pyrolitic carbon, amorphous carbon, $Mo_6S_8$, $MnO_2$, CuS, $Cu_2S$, $Ag_2S$, $CrS_2$, $VOPO_4$, $TiS_2$, $V_2O_5$, $MgVO_3$, $MoS_2$, $MgV_2O_5$, $MoO_3$, $CuCr_2S_4$, $MgCr_2S_4$, $MgMn_2O_4$, $Mg_2MnO_4$, $MgFe_2(PO4)_3$, $MgV_2(PO_4)_3$, $MgMnSiO_4$, $MgFe_2(PO_4)_2$, $Mg_{0.5}VPO_4F$, $TiP_2O_7$, $VP_2O_7$ and $FeF_3$.

11. The magnesium battery of claim 8, further comprising a non-noble metal component.

12. The magnesium battery of claim 8, wherein the solvent is selected from the group consisting of tetrahydrofuran, 2-methyl tetrahydrofuran, dimethoxyethane, glyme, monoglyme, dimethyl glycol, ethylene glycol dimethyl ether, diethyl ether, ethyl glyme, diglyme, proglyme, ethyl diglyme, triglyme, butyl diglyme, tetraglyme, polyglyme, higlyme, and a mixture thereof.

13. The magnesium battery of claim 8, wherein $Ar_F$ is a phenyl group which comprises at least one fluorine atom.

14. The magnesium battery of claim 8, wherein $Ar_F$ is a phenyl group which comprises at least one substituent selected from the group consisting of a $CF_3$— group, a $CF_2H$ group and a $CFH_2$— group.

15. The magnesium battery of claim 8, wherein the magnesium electrolyte of formula (I) is $Mg(THF)_6[(C_6F_5)_3B(C_6H_5)]_2$.

* * * * *